United States Patent [19]

Viviano et al.

[11] Patent Number: 5,309,481

[45] Date of Patent: May 3, 1994

[54] APPARATUS FOR ADJUSTING SIGNAL POINTS, EQUALIZER COEFFICIENTS AND THE LIKE

[75] Inventors: Jerome J. Viviano; Teri C. Raynor, both of Madison, Ala.

[73] Assignee: Universal Data Systems, Inc., Huntsville, Ala.

[21] Appl. No.: 37,952

[22] Filed: Mar. 26, 1993

Related U.S. Application Data

[63] Continuation-in-part of Ser. No. 718,459, Jun. 20, 1991, abandoned.

[51] Int. Cl.⁵ ............................................. H04L 27/08
[52] U.S. Cl. ........................................ 375/98; 375/14; 375/39; 455/234.1
[58] Field of Search ............................ 375/14–15, 375/39, 42, 98; 371/43; 330/254; 455/59–60, 234.1

[56] References Cited

U.S. PATENT DOCUMENTS

4,631,738 12/1986 Betts et al. ......................... 375/98
4,683,578 7/1987 Betts et al. ......................... 375/39
4,771,438 9/1988 Nash .................................. 375/42
4,866,395 9/1989 Hostetter ........................... 329/309
5,027,371 6/1991 Sehier et al. ...................... 375/15

Primary Examiner—Stephen Chin
Assistant Examiner—Young Tse
Attorney, Agent, or Firm—Wayne J. Egan

[57] ABSTRACT

Apparatus for identifying (78) a signal point of a receive constellation corresponding to an extracted symbol of a train of symbols of a modulated communication signal and for adjusting (88) the signal point to a new position of the receive constellation based on the position of the extracted symbol in relation to the current position of the signal point. The new position of the identified signal point becomes part of the receive constellation for processing at least one subsequently extracted symbol of the communication signal. In addition, apparatus is provided for adjusting (120) equalizing coefficients of an equalizer (76) based on factors including an equalized extracted symbol, the identified signal point, corresponding extracted symbols of the equalizer, and an adaptive gain factor.

36 Claims, 8 Drawing Sheets

APPARATUS FOR ADJUSTING SIGNAL POINTS, EQUALIZER COEFFICIENTS AND THE LIKE

This is a continuation-in-part of application Ser. No. 07/718,459, filed Jun. 20, 1991 now abandoned.

FIELD OF THE INVENTION

The present invention relates to the communication of communication signals modulated to include digital data in the form of a train of symbols over communication media utilizing a predetermined transmit constellation of signal points, and more particularly, to apparatus for identifying a signal point of a receive constellation corresponding to an extracted symbol of the communication signal and adjusting the receiver signal point to a new position in the constellation of receiver signal points based on the position of the extracted symbol in relation to the current position of the receiver signal point, the new position of the identified receiver signal point becoming part of the constellation of receiver signal points for processing at least one subsequently extracted symbol of the communication signal, and to apparatus for adjusting the gain factor used in adjusting the receiver signal points and equalizing coefficients of an equalizer based on a function of factors including the identified signal point.

BACKGROUND OF THE INVENTION

As is known, data communication equipment ("DCE") such as modems, for example, are able to transmit digital data over channels to remote DCE units. To accomplish this task, the sending DCE typically contains a constellation of transmitter signal points, with each transmitter signal point representing a digital code or value to be transmitted to the receiving DCE. The sending DCE thus modulates a carrier signal at the transmitter signal point corresponding to the digital code or value to be sent. The receiving DCE, in turn, contains a constellation of receiver signal points that is compatible with the transmitter signal points in the sending DCE. The receiving DCE thus demodulates the received carrier signal and identifies a corresponding receiver signal point from the receive constellation of receiver signal points. The receiving DCE then determines the digital code or value represented by the receiver signal point.

Presently, data communication equipment, such as modems, for example, are being used to communicate digital data between data terminal equipment (DTE), such as personal computers, workstations and the like, over telephone lines using a standard communication format or constellation of signalling points, such as the CCITT V.22 bis signalling format, for example. In transmitting and communicating digital data in a telephone network, the primary source of distortion of the communication signal is linear in nature and is handled effectively by equalization techniques implemented in the DCE's at both ends of the communication link. Most telephone lines do not induce severe enough non-linear signal distortion of the communication signal to warrant a separate processing subsystem in a modem to mitigate the non-linear effects on the standard signalling format.

Recently, it has been proposed to communicate digital data over a cellular telephone network using a standard communication signalling constellation, like the CCITT V.22 bis format, for example. However, the cellular network is recognized as introducing distortive effects on the communication signal substantially different from that of the telephone network because it is designed primarily to communicate voice only signals over voice band media in which commercial channel bandwidth is severely restricted, that is the cellular network is not designed for transmitting digital data.

In the transmission of voice signals in a cellular network, the audio signal input to a microphone is generally used in controlling the instantaneous FM radio signal frequency. A limiter circuit in the transmitter limits the audio voltage before it controls the radio signal to keep it from moving too far from its center frequency, thus reducing interchannel interference. This process is better known in the communication field as clipping and is a form of non-linear distortion of the communication signal. Accordingly, clipping is designed intentionally into the cellular transmitter of the cellular network to keep or limit radio frequency (RF) spillage over into an adjacent communication channel, that is, the limiter precludes moving the instantaneous frequency of the communication channel too far from that desired. Clipping causes time-varying group delay (amplitude induced group delay distortion) on the digital data transmission which results in the symbols thereof becoming distorted at the receiving end to the point where the reliability thereof is questionable. That is, a distorted symbol may be closer to a signal point of a receive constellation other than that intended and misconstrued by a data estimator of the receiving modem as applying to an unintended digital data code. These non-linear effects may cause poor throughput in digital data communication between modems by creating difficulties in making initial connection, and if re-transmission capabilities exist may cause retransmissions of the same data due to poor quality transmission over a preceding communication period.

There are a number of possible solutions to the non-linear distortion problem, one being designing a signalling format which is impervious to non-linearities, but any new signalling format would be non-standard and the corresponding modem application would not be capable of communicating with everybody else. Another solution may be to accept the non-linearly distorted communication signal using a standard signalling format and undo the distortive effects at the receiving modem.

It has been proposed theoretically to combat non-linear effects as well as linear effects on communication signals through the use of Volterra series or kernel characterization of a general non-linear system. An example of this theoretical solution is described in the paper: D. D. Falconer, "Adaptive Equalization of Channel Non-Linearities in QAM Data Transmission Systems", Bell Systems Technical Journal, Volume 57, No. 7, September, 1978. In essence, these type systems condition the received signal to render it accurate for use in a fixed signalling format using a passband decision feedback equalizer to remove both linear and non-linear effects on the incoming communication signal based on a model of the passband channel. While offering an effective theoretical technique of solving the problem, the Volterra series method is not considered practical because it is extremely computationally intensive and would probably require an additional separate processor in a modem to handle the computational load associated therewith. In addition, the Volterra series requires an extremely long time to converge to a solution which is not suitable for conventional digital communication equipment.

Accordingly, what is needed is data communication equipment which can communicate digital data information at suitable throughput rates over a communication media under the effects of both linear and non-linear distortion. It is desirable that the digital communication equipment operate within a standard signalling format for digital data communication and undo the distortive effects of the communication signal using techniques which are substantially less computationally intensive and time consuming as those of the Volterra series.

DESCRIPTION OF THE PREFERRED EMBODIMENT

Figure 1:
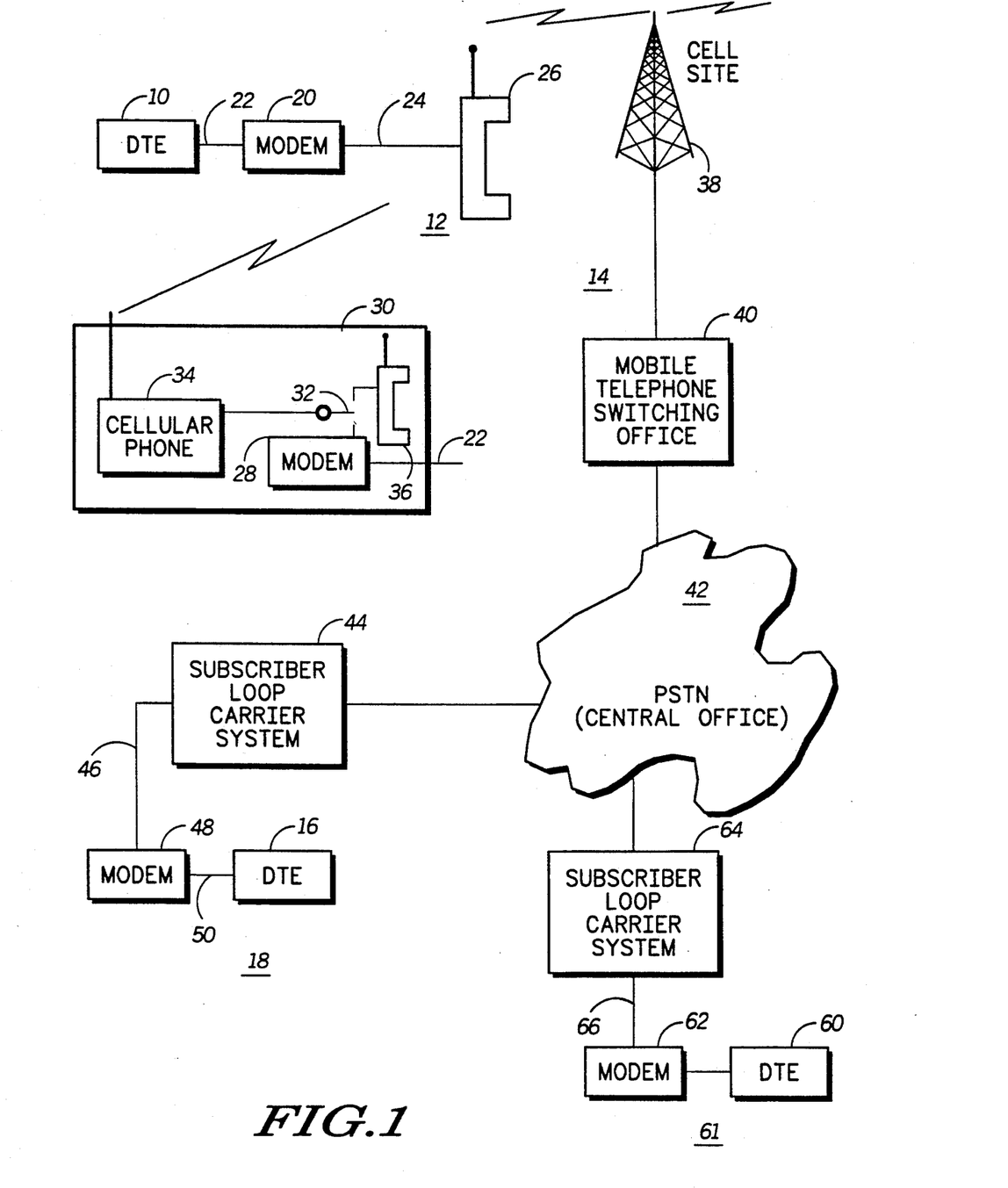
FIG. 1 is an illustration of a suitable communication network environment for applying the principles of the present invention.

FIG. 1 is an illustration of a suitable communication network environment for applying the principles of the present invention. Referring to FIG. 1, digital data communication may be effected from a data terminal equipment (DTE) 10 at a site 12 via a cellular telephone network 14 to another DTE 16 at a site 18 which may be a subscriber site of a public telephone system. The DTE 10 provides digital data over a conventional link 22 to a modem 20 which may be of a type manufactured by Universal Data Systems (UDS) Model No. FasTalk TM 2400/5 LP2, for example. Modem 20 is coupled over a conventional link 24 to a portable or personal cellular telephone 26 which may be of a type manufactured by Motorola under the trade name Microtac, TM for example. The DTE 10 causes the modem 20 to generate a communication signal which is modulated to include the digital data in the form of a train of ideal symbols based on a predetermined transmit constellation of signal points which shall be described in greater detail hereinbelow.

In the alternative, the DTE 10 may provide the digital data to a similar modem 28 of a mobile unit 30 at the site 12. The modem 28 may be switchably connected via switch 32 to a cellular phone 34 of the mobile unit 30. The switch 32 may switch between a telephone handset 36 and the modem 28. The mobile cellular phone 34 may be of the type manufactured by Motorola bearing the Model No. S1703C. Similarly, the modem 28 is caused to generate the communication signal including the digital data in the same manner as described for the portable cellular phone 26.

The communication signal is, in turn, transmitted from either of the cellular phones 26 or 34 over the airwaves using conventional radio frequency carrier RF signalling to a cell site 38 of the cellular network 14 and there it is conducted through a conventional mobile telephone switching office 40 into a public switched telephone network PSTN 42 and to a central office thereof. From the central office of the PSTN, the communication signal is routed through the appropriate subscriber loop carrier system SLCS 44 and over conventional telephone lines 46 to a receiving modem 48 which may be of the same type as modems 20 and 28. Modem 48 is linked via conventional link 50 to the DTE 16 at the site 18. The modem 48 receives the communication signal including the modulated digital data thereof and processes the received modulated symbols in accordance with a receive constellation of signal points to retrieve the digital data which is provided to the DTE 16 over the link 50. The DTE 16 may, in turn, return digital data via the same route as described supra to the cellular system 14 and DTE 10 at site 12.

The DTE's 10 and 16 may communicate digital data with other DTE's at other sites, cellular or PSTN, using a similar communication signal routing arrangements. For example, the DTE 16 may also provide digital data to the modem 48 and cause it to communicate with another DTE 60 at a subscriber site 61. The DTE 60 is coupled to the public telephone network via a modem 62 and subscriber loop carrier system 64 utilizing conventional telephone line 66. In the present embodiment, the transmission of digital data from the DCE's is in the form of a train of ideal symbols based on a predetermined transmit constellation of signal points. It is understood that the modulated symbols of the communication signal may be distorted from their positions of the constellation of ideal signal points as a result of linear and non-linear effects according to the transmission and communication techniques and arrangements of the communication system.

An example of a situation that results in non-linear distortion of the communication signal as a result of the transmission thereof occurs in cellular communications and more specifically the cellular telephone transmitter in which the modulated communication signal is passed through a hard limiter stage which confines the maximum frequency deviation from its center frequency to avoid interference with neighboring frequency channels of the cellular network. This limiting or clipping of the communication signal is a non-linear operation that standard telephone modems normally are not confronted with. Accordingly, performance of the telephone modem can be severely degraded to the point of uselessness if the level of non-linear distortion becomes significant to result in a substantial reduction to noise immunity. One aspect of the present invention is to increase the noise immunity of a DCE, especially with regard to non-linear signal distortion of the foregoing described type.

Figure 2:
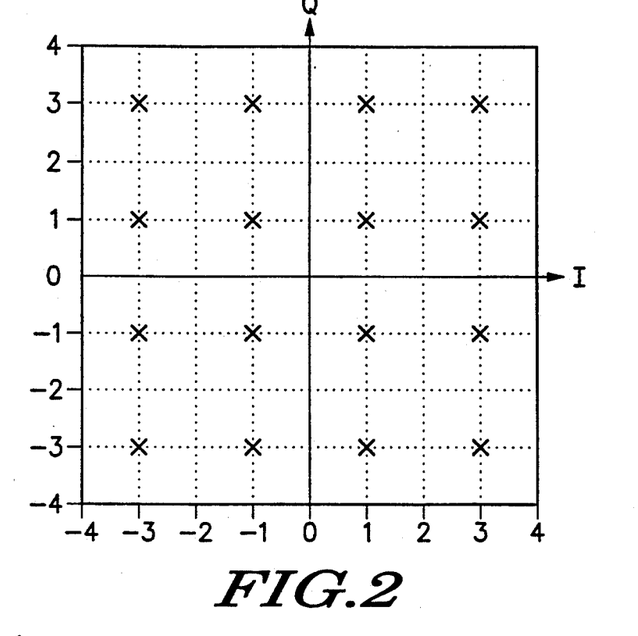
FIG. 2 is a graph exemplifying the signal points of the CCITT V.22 bis constellation.

As has been indicated above, a conventional data communication equipment (DCE) or modem transmits digital data in the form of a train of modulated ideal symbols based on a predetermined transmit constellation of signal points. Each signal point of the transmit constellation represents a digital code. For example, the CCITT V.22 bis standard comprises a constellation of 16 unique signal points which are shown by the X's in the graph of FIG. 2. Each signal point is representative of a digital code of information and is characterized by an in-phase I and quadrature Q value as a two dimensional vector, for example. A scatter plot of each of the 16 possible ideal vectors of the typical transmit constellation of FIG. 2 is shown in the Table 1 herebelow.

TABLE 1

| Signal Point | I | Q |
|---|---|---|
| 1 | −3.0 | 30 |
| 2 | −1.0 | 3.0 |
| 3 | 1.0 | 3.0 |
| 4 | 3.0 | 3.0 |
| 5 | −3.0 | 1.0 |
| 6 | −1.0 | 1.0 |
| 7 | 1.0 | 1.0 |
| 8 | 3.0 | 1.0 |
| 9 | −3.0 | −1.0 |
| 10 | −1.0 | −1.0 |
| 11 | 1.0 | −1.0 |
| 12 | 3.0 | −1.0 |
| 13 | −3.0 | −3.0 |
| 14 | −1.0 | −3.0 |
| 15 | 1.0 | −3.0 |
| 16 | 3.0 | −3.0 |

Accordingly, each symbol or baud period of the communication signal is modulated to create a symbol positioned in the transmit constellation by the in-phase and quadrature components thereof to be substantially at the signal point of the transmit constellation corresponding to the digital data code intended to be represented thereby in the train. For the V.22 bis standard, for example, there are 600 baud periods per second with each baud period containing a symbol representing 4 bits of digital data code. Consequently, at 600 baud periods per second, the V.22 bis standard is capable of communicating 2400 bits per second of digital data information.

As has also been indicated above, non-linearities in the transmitting modem, receiving modem and communication media, like that illustrated in FIG. 1, for example, may cause substantial distortion of the modulated symbols in the communication signal. The primary type of non-linearity that one might expect to deal with in cellular networks may be approximated by the following expression:

$$V_{out} = \sum_{i=0}^{\infty} a_i (V_{in})^i$$

Figure 3:
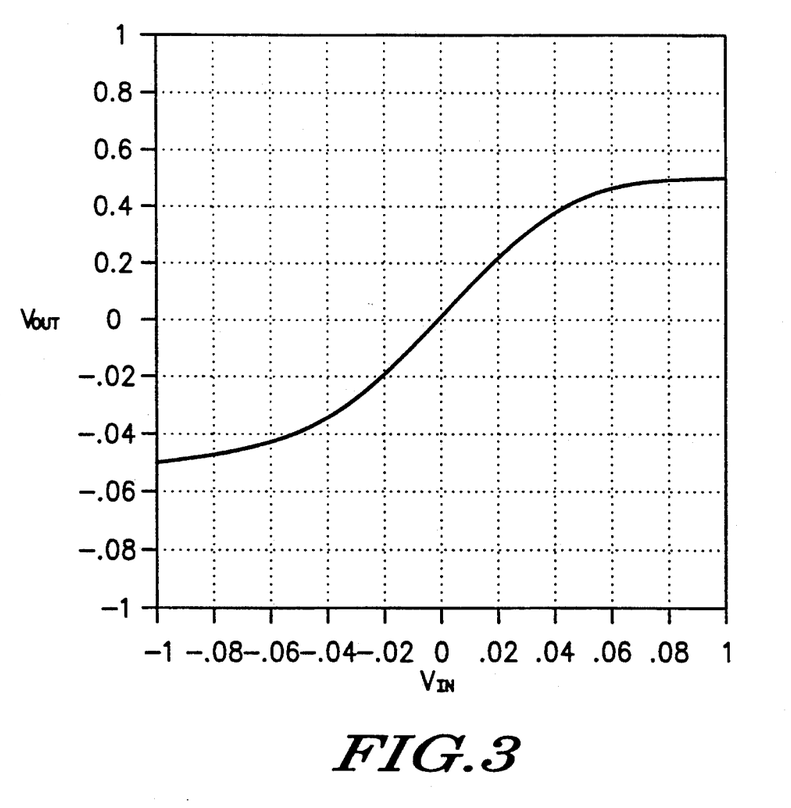
FIG. 3 is a graph exemplifying a non-linear limiting function.

The above mathematical equation may be expressed as a sum of weighted input values raised to integer powers. For example, in the case where $a_0 = 0$, $a_1 = 1$, and $a_i$'s are 0 for even i, a compressing or limiting function may be generated and mathematically expressed as follows:

$$V_{out} = V_{in} - 0.8(V_{in})^3 + 0.3(V_{in})^5$$

which is illustrated in the graph of FIG. 3.

Figure 4:
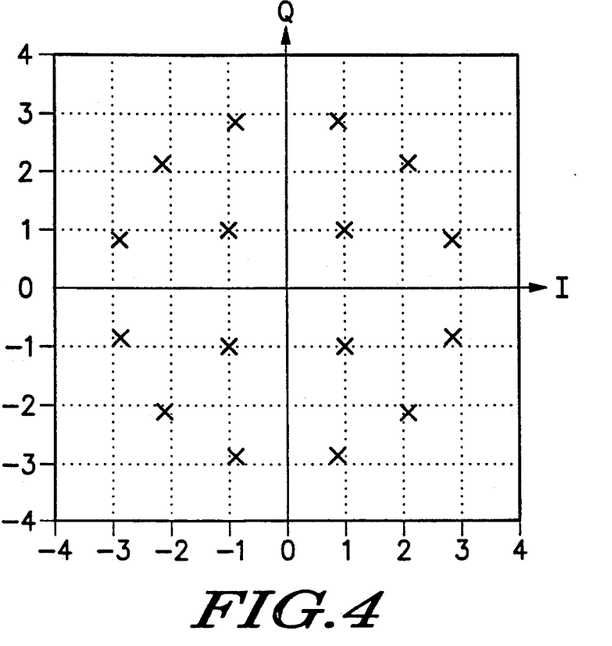
FIG. 4 is a graph exemplifying non-linear distortion of transmitted symbols of the V.22 bis transmit constellation.

In operating a modem generated carrier signal through a non-linear function such as that illustrated in FIG. 3, it is recognized that the amplitude modulation of the carrier may be severely distorted. Since the amplitude of the carrier controls the position of the symbol or vector at the receiving end, it is clear that such amplitude distortion causes a deviation in the I,Q position of the symbol in the receive constellation. An example of such distortion of the transmitted symbols of the V.22 bis transmit constellation is shown in the graph of FIG. 4.

Figure 5:
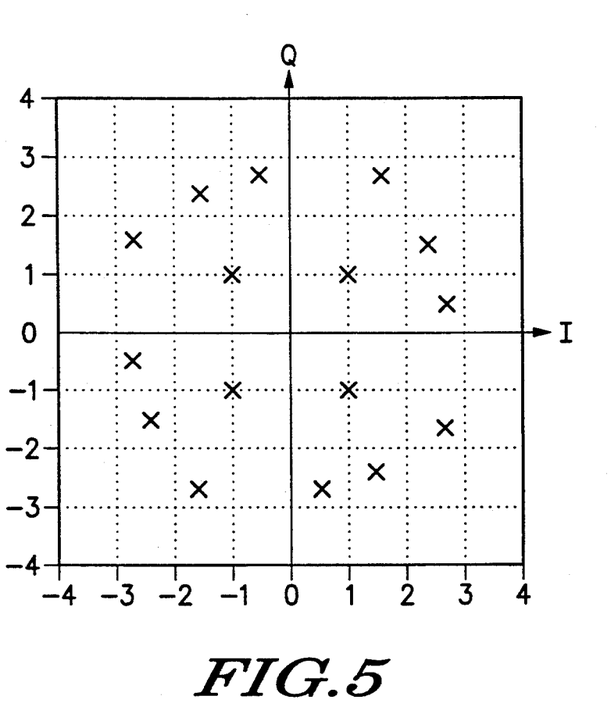
FIG. 5 is a graph exemplifying phase distorted effects on the symbols of the V.22 bis transmit constellation.

To complicate matters, the distorted symbol is generally conducted through general low pass and band pass filters in both the cellular transmitting and receiving data communication equipment which disperse in time the non-linear effects. By the time the transmitted symbol is received by the receiving modem, it may already have been subjected to the time-dispersive effects of the various communication filters. An additional result of the filtering of the non-linear effects is one of phase distortion as a function of signal amplitude. The graph of FIG. 5 exemplifies these phase distortive effects particularly on the outer symbols of the receive constellation.

Figure 6:
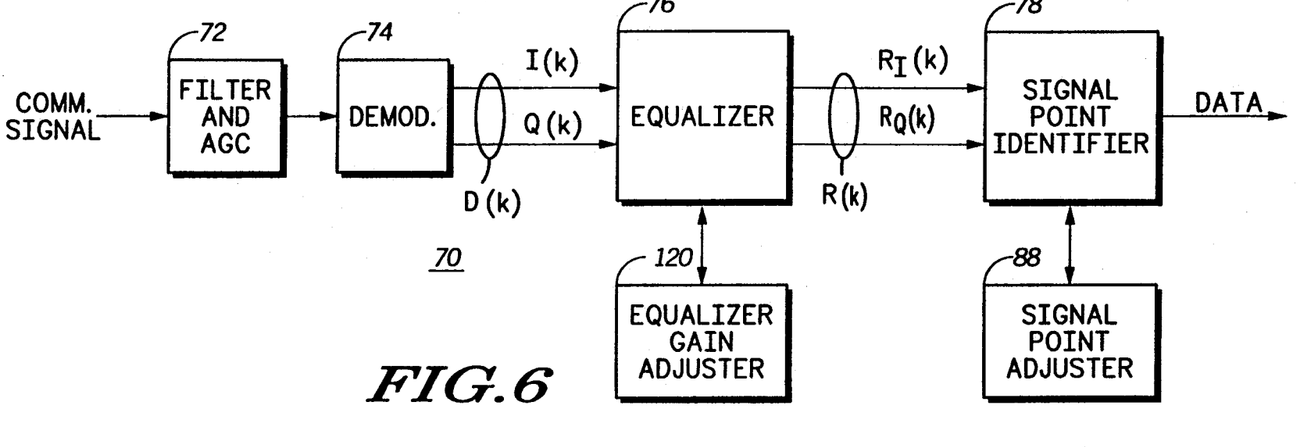
FIG. 6 is a functional block diagram schematic embodiment of portions of a data communication equipment suitable for use in the communication system of FIG. 1.

A functional block diagram schematic embodiment of portions of a data communication equipment or modem 70 suitable for use in the communications system of FIG. 1 is shown in FIG. 6. Referring to FIG. 6, the communication signal after being received by the receiving modem 70 is processed first by a set of filters and an adaptive gain control (AGC) function in a section 72 prior to being demodulated by a demodulation section 74. Each symbol of the communication signal is extracted by the processing blocks 72 and 74 as characterized by the in-phase and quadrature components thereof. For example, during the kth symbol period, the demodulator section 74 develops the in-phase and quadrature components I(k) and Q(k), respectively, as representative of the kth demodulator output, D(k). The I and Q components of each D(k) of the train may be input to an equalizer section 76, if such a section is included in the receiving modem, for inverting the effects of linear distortion of the received symbols.

Figure 7:
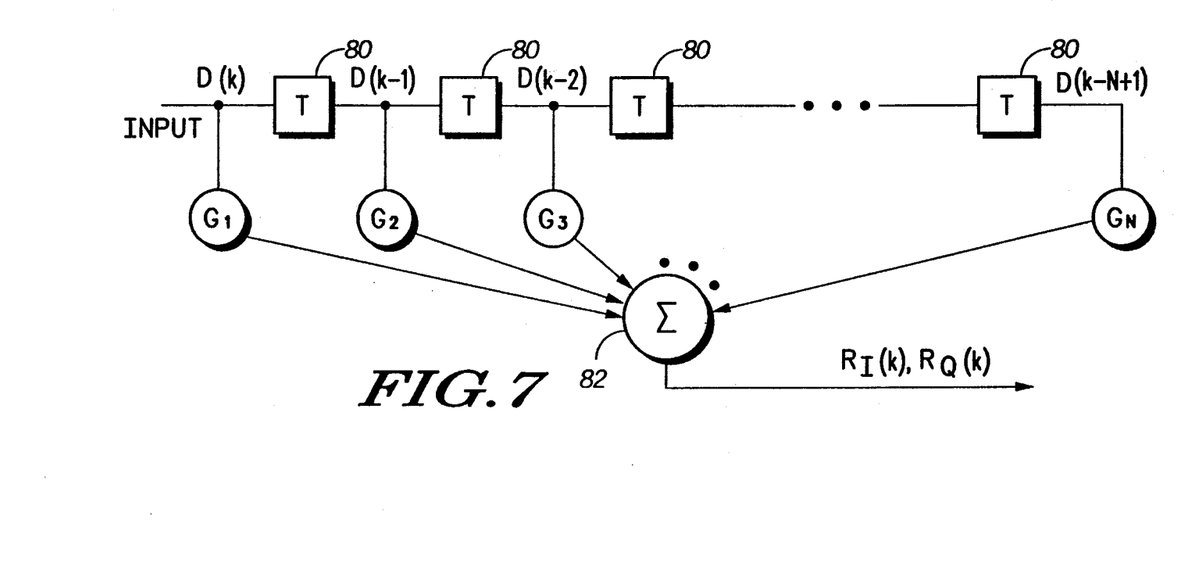
FIG. 7 is a functional block diagram of an equalizer suitable for use in the embodiment of FIG. 6.

A suitable equalizer 76 for the purposes of describing the present embodiment, by way of example, is shown in FIG. 7. Equalizers of this type, which are commonly referred to as tapped delay line equalizers, generally process a current D(k) which for the present example is the kth demodulator output along with at least one other demodulator output of the train which may be denoted as D(k−1) for the preceding symbol and D(k+1) for the succeeding symbol. In the block diagram example of FIG. 7, delay blocks 80 of the tapped delay line may be designed to delay the communication signal 1 baud period; in which case, the signals D(k), D(k−1), D(k−2), ..., D(k−N+1) correspond to the demodulator outputs for the symbol periods k, k−1, k−2, ..., respectively. Each signal D(k)—D(k−N+1) of the tapped delay line may be processed by a corresponding equalizer coefficient $G_1$−$G_N$, respectively, and the resultant signals combined in a summer 82 to yield an equalized symbol $R_I(k)$, $R_Q(k)$. While the above equalizer has been described as a single processing unit in connection with complex signal variables, it is understood that generally separate tapped delay lines are used for each of the in phase and quadrature components of the demodulator outputs D(k) with cross product interaction therebetween in the processing thereof to yield the respective equalized symbol components $R_I(k)$ and $R_Q(k)$, which together are taken as a single complex equalized symbol R(k). Further, while the delays have been described as being 1 baud period, it is understood that, for some conditions, the delays may be a portion of the baud period or some multiple thereof as the case may be. Still further while the exemplary embodiment of FIG. 7 has been described with only preceding demodulator outputs, it is understood that an equalizer may also process succeeding demodulator outputs as well as without deviating from the principles of the present invention. In the case where the receiver does not employ the use of an equalizer, the demodulator output D(k) takes on the role of R(k) in any further receiver signal processing.

In the instant embodiment of the receiving modem 70 as shown by the block diagram of FIG. 6, a signal point identifier 78 is provided for identifying the signal point $S_n(k)$ of the receive constellation corresponding to R(k) based on some predetermined criteria. The identified signal point $S_n(k)$ is used to retrieve the digital data code of R(k) in accordance with the receive constellation. In the present embodiment, the nearest signal point to R(k) of the receive constellation is the identified signal point $S_n(k)$.

Figure 8:
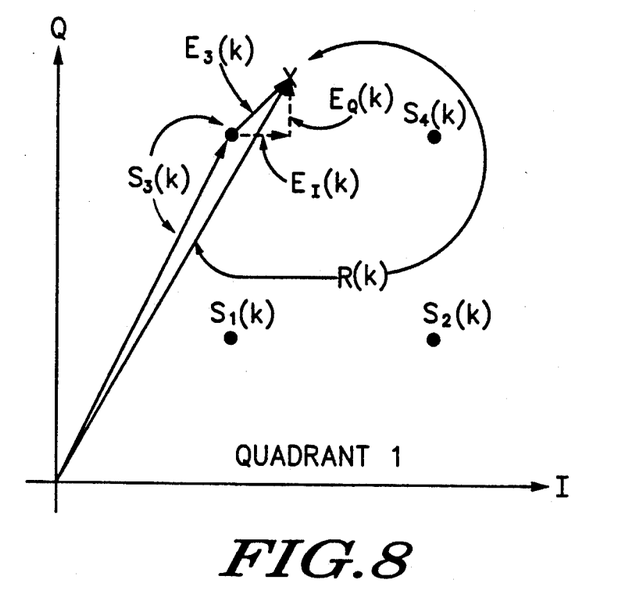
FIG. 8 is a graph illustrating a method for use by the signal point identifier of the embodiment depicted in FIG. 6.

The method used by the signal point identifier 78 for the present embodiment is illustrated by the graph of FIG. 8. While the example of FIG. 8 refers only to quadrant 1 of the receive constellation, it is understood that the principles described in relation thereto may be applied to the other 3 quadrants of the receive constellation as well. The instant example will be described in connection with the kth symbol period, which may be typical of any symbol period thereof. The position of the signal points $S_1(k)$, $S_2(k)$, $S_3(k)$ and $S_4(k)$ of the receive constellation are denoted by the dots in the graph. The position of the kth extracted symbol or vector R(k) is denoted by the X in the graph.

More specifically, the signal point identifier 78 of the instant embodiment measures an error vector from each of the signal points $S_1(k), \ldots, S_n(k)$ of the receive constellation to the position of the extracted symbol R(k) and then identifies the signal point corresponding to the smallest error vector as the identified signal point. In the example shown in FIG. 8, the signal point $S_3(k)$ is the nearest signal point and thus assumed to be the signal point intended to represent the digital data code of R(k). However, it is understood that amplitude and phase distortions may result in an R(k) with large enough positional difference to cause a selection, using the nearest signal point criteria, of a signal point which was not intended to represent the digital data code thereof. Accordingly, this is the type of problem that the present invention intends to rectify.

The cause of the misidentification under the foregoing described circumstances results from an assumption built into the design of the identifier function 78 that since the transmitted symbol is characterized by I,Q coordinates of +/−1 and +/−3, that the received corresponding equalized symbol R(k) in the train will be clustered around the I and Q coordinates of +/−1 and +/−3, respectively as well. This assumption is normally valid for communication systems limited primarily to linear distortion, but not when the communication signal under goes non-linear distortive effects as in cellular telephone networks, for example. Thus, for the non-linear distortion case, the signal points of the receive constellation cannot remain fixed and consistent with the transmit constellation signal points, under all conditions. Rather, the signal points of the receive constellation should be adjusted based on a learning process using the distorted received equalized R(k)'s. In accordance with one aspect of the present invention, the distorted received R(k)'s are interpreted and used to reposition the signal points of the receive constellation to more accurately identify the intended digital data code of the distorted received R(k). Unless the non-linearities are extreme in the communication system, the statistical R(k) clustering about its intended signal point should be small enough to allow nearly error-free interpretation. An example of a set of repositioned signal points for a receive constellation which can interpret the incoming R(k)'s with a higher degree of accuracy is shown in the Table 2 found herebelow (refer to signal points of FIG. 5).

TABLE 2

| Signal Point | I | Q |
|---|---|---|
| 1 | −1.5 | 2.4 |
| 2 | −0.5 | 2.7 |
| 3 | 1.6 | 2.7 |
| 4 | 2.4 | 1.5 |
| 5 | −2.7 | 1.6 |
| 6 | −1.0 | 1.0 |
| 7 | 1.0 | 1.0 |
| 8 | 2.7 | 0.5 |
| 9 | −2.7 | −0.5 |
| 10 | −1.0 | −1.0 |
| 11 | 1.0 | −1.0 |
| 12 | 2.7 | −1.6 |
| 13 | −2.4 | −1.5 |
| 14 | −1.6 | −2.7 |
| 15 | 0.5 | −2.7 |
| 16 | 1.5 | −2.4 |

In the present embodiment, a signal point adjuster section 88 is provided to coordinate with the signal point identifier 78 for adjusting an identified signal point from its current position $S_n(k)$ to a new position $S_n(k+1)$ of the receive constellation based on the position of the equalized symbol R(k) in relation to the current position $S_n(k)$ for use by the identifier section 78 in identifying the signal point of the receive constellation corresponding to at least one subsequent R(k+1) of the equalized symbol train.

Figure 9:
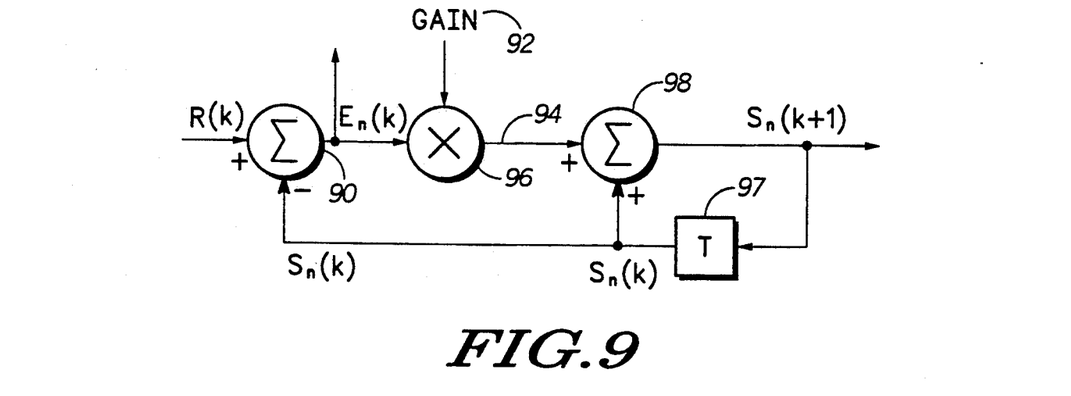
FIG. 9 is a block diagram schematic of a suitable signal point adjuster for use in the embodiment of FIG. 6.

A block diagram schematic of a suitable signal point adjuster for use in the embodiment of FIG. 6 is shown in FIG. 9. Referring to FIG. 9, the identified signal point $S_n(k)$ is subtracted from the received vector R(k), which may be equalized if an equalizer section is provided in the receiving modem or which otherwise is unequalized, in a summer unit 90 to generate an error signal $E_n(k)$ which is adjusted by a gain factor 92 to generate an adjusted error signal 94. In the present embodiment, the error signal $E_n(k)$ is multiplied by the gain factor 92 in a multiplier unit 96. The adjusted error signal 94 is combined with the current position $S_n(k)$ of the identified signal point to estimate a new position $S_n(k+1)$ thereof. A delay block 97 is provided to cause a 1 symbol period delay between the current and new positions of the identified signal point and a summer 98 is used to add the adjusted error signal to the current signal point in the present embodiment. Accordingly, each signal point $S_n$ of the receive constellation may be adjusted when identified as the nearest signal point to the equalized symbol R(k) in this manner. Consequently, the signal point adjuster 88 learns over a period of time in dealing with many received distorted R(k)'s how to adjust the signal points of the receive constellation to new positions in order to optimize the digital data estimation of the received symbols in the identifier section 78.

It is recognized that all of the error of the received distorted R(k)'s may not be due to non-linear effect, thus the gain factor 92 of the embodiment of FIG. 9 is used to slow the adaptation process so that it will not converge to an erroneous signal point position using only a few corresponding equalized symbols. The gain factor 92 limits the amount of repositioning or correction applied to the appropriate signal point to a fraction of the last detected error. Accordingly, the adaptation or correction process is thus spread over a greater number of symbols, that is intentionally inducing a lag effect or low pass filtering action into the signal point adjuster control loop making it less sensitive to erratic symbol disturbances due to noise, etc. and more sensitive to the slowly varying non-linear effects of the signal point of interest.

The signal point adjuster control loop embodiment depicted in FIG. 9 processes variables which are complex in nature including the in-phase I and quadrature Q components thereof. However, it is understood that two separate control loops may be used to process respectively the in phase and quadrature components of such variables without deviating from the principles of the present invention. In addition, while only a single complex control loop has been described for processing the identified signal point of the set of receiver signal points and storing the adjusted position thereof in a table in memory, such as the Table 2 shown hereinabove, it is understood that, in the alternative, a separate complex control loop may be provided for each signal point of the receive constellation; in which case, the adjusted signal point value may be provided in the output register or registers thereof for use by the identifier section 78 in connection with the subsequently extracted equalized R(k+1) of the train.

The gain factor 92 of the signal point adjuster embodiment may be a constant, or time varying, or adaptive in accordance with some variable. For example, the gain factor may be set to a high level allowing the control loop or loops to learn quickly, and then reduced to a smaller value after a fixed period of time in order to stabilize the steady state performance of the loop. In the alternative, an adaptive gain factor adjustment system may be able to sense whenever the stored signal points, such as that depicted in Table 2, for example, show a trend of misalignment with recent incoming receive signals. When this occurs, the gain may be set ideally large. When the stored signal points are fairly well centered in individual clusters by the received equalized symbols, adaptation may be considered complete and the gain factor set to a smaller value.

One method of effecting such an adaptive control of the gain factor at a symbol period is to concentrate on the identified signal point considering first the case that it is set to a proper position in the receive constellation. Noise causes non-zero error factors between the corresponding R(k)'s and the signal point; however, the I and Q components of the error factors due to noise alone will each be, on the average, zero. Inputting the error vector components into a corresponding pair of low pass filters associated with the corresponding signal point will result in the filtered outputs staying very near zero. On the other hand, if the error factors of the signal point are consistently too far to the left and also too high above a proper signal point setting, for example, then these error factors are not considered as being caused solely by noise, but rather include non-linear effects as well. In this example, the I component of the error vector will generally read positive and the Q component negative. Inputting the I and Q components of the error vector into respective low pass filters will result in the I filter output growing to a positive value, and the Q filter output growing to a negative value. The fact that the low pass filter outputs have grown to relatively large values, positive or negative, is sufficient to indicate that the corresponding signal point is in the wrong position of the received constellation, which in turn implies that a large gain factor for the signal point adjuster is needed to render a quicker adjustment. A functional block diagram schematic suitable for embodying the principles of such an adaptive gain factor adjuster is shown in FIG. 10.

Figure 10:
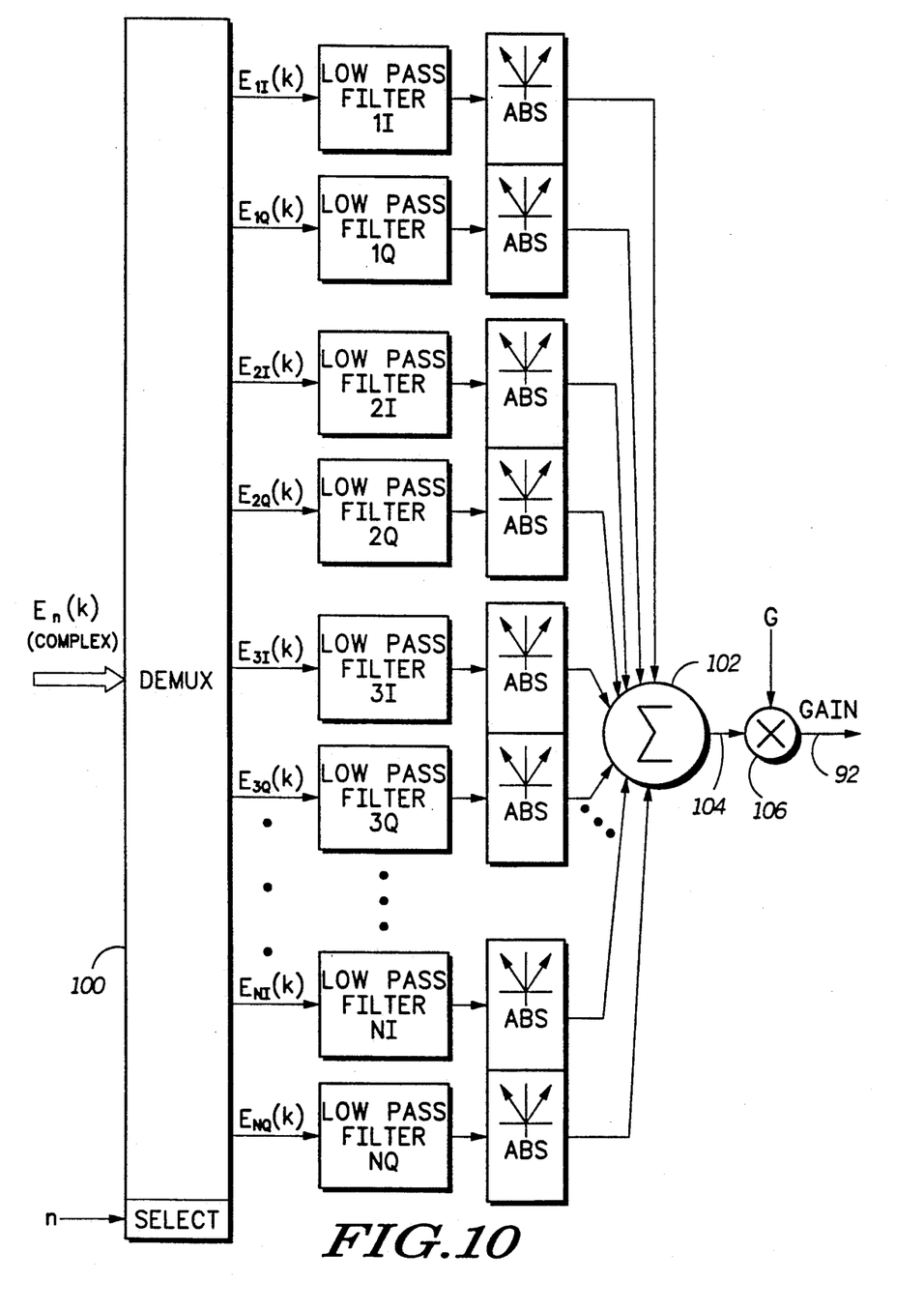
FIG. 10 is a functional block diagram schematic of an adaptive gain factor adjuster for use in the embodiment of FIG. 6.

Referring to FIG. 10, a pair of low pass filters is provided respectively for the in-phase and quadrature errors of each signal point identifiable by the signal point adjuster. The identified pair of error vectors $E_{nI}(k)$ and $E_{nQ}(k)$ are routed to the appropriate low pass filter pair by a demultiplexer unit 100 using selector signal n. The outputs of the low pass filters are each input to an absolute value section which is used to sense a "buildup" on any filter output, positive or negative. The outputs of the absolute value sections are then combined in a summer 102 to produce a signal 104 which is representative of the new or adjusted gain factor. The signal 104 may be modified by multiplying it by a fixed gain G in a multiplier unit 106 to yield the new or adjusted gain factor 92 which is used in the signal point adjuster embodiment of FIG. 9 to process any future R(k)'s.

To summarize, in the situation in which the stored signal points are in their proper locations of the received constellation, the error vectors in relation to the equalized symbols of the received communication signal will render no trends statistically and the respective outputs of their low pass filters will stay at substantially zero. Accordingly, the absolute values thereof and resultant composite summation also stays near zero. A relatively small gain factor is yielded implying that little or no adjustment is desired in the signal points of the received constellation, that is, the desired effect of adaptation is considered substantially completed. On the other hand, when some or all of the signal points of the receive constellation move out of their proper positions statistically, the filtered error signals grow in value over time which causes a net increase in the gain factor 92 to cause a repositioning of the signal points at a faster rate.

Figure 11:
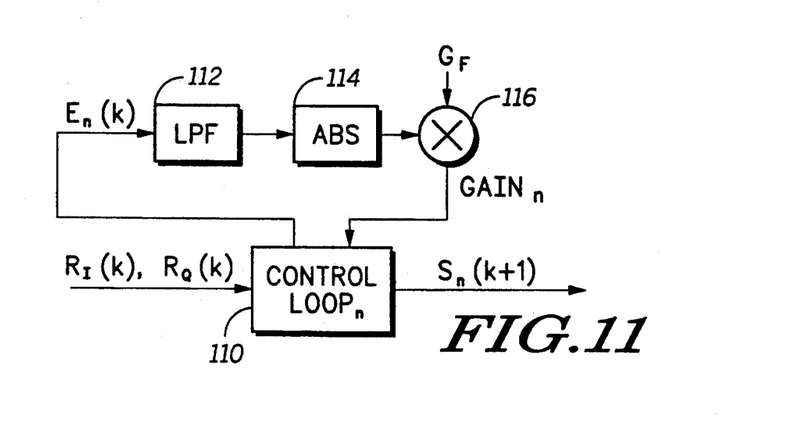
FIG. 11 is a block diagram schematic of an alternate embodiment of an adaptive gain factor adjuster.

In an alternate embodiment, the gain factor of each control loop of the signal point adjuster 88 may be individually adaptively adjusted as illustrated by the functional block diagram schematic of FIG. 11. The control loop of the nth signal point, by way of example, is represented by the block 110 and may be similar to that described in connection with the embodiment of FIG. 9. The resultant complex error $E_n(k)$ may be input to a conventional low pass filter (LPF) 112. The filtered error signal of the LPF 112 may be input to an absolute value circuit (ABS) 114. The output of the ABS 114 may be modified by a fixed gain $G_F$ in a multiplier section 116 to effect the individual gain factor for the control loop n. Accordingly, the individual gain factor of each control loop is adjusted adaptively based on its corresponding error signal or difference between the extracted symbol, equalized or otherwise, and the identified signal point associated therewith.

Figure 12:
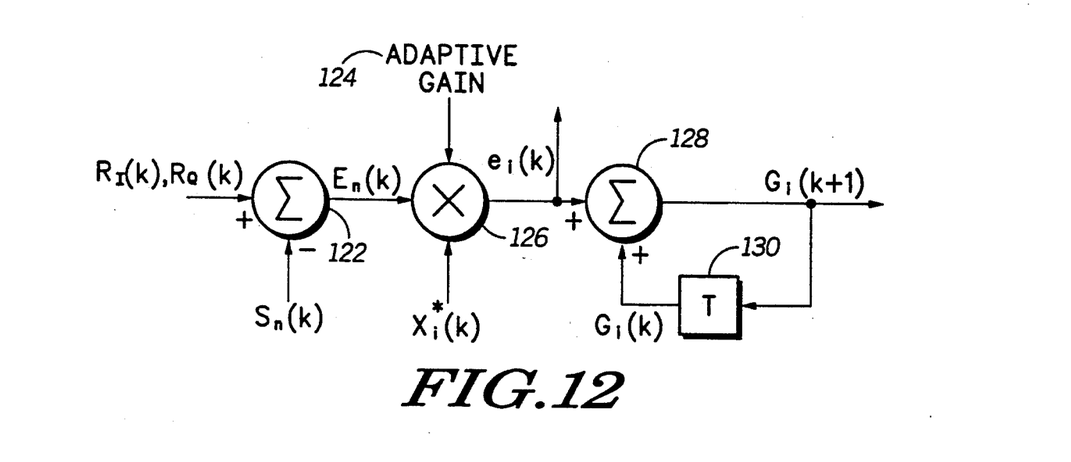
FIG. 12 is a functional diagram schematic of an equalizer gain adjuster suitable for use in the embodiment of FIG. 6.

In another aspect of the present invention, the gains $G_1$-$G_N$ of the equalizer 76 may be adjusted to new values using an equalizer coefficient adjuster 120 which is coupled to the equalizer 76 as shown in the block diagram schematic of FIG. 6. A functional schematic diagram of an equalizer coefficient adjuster suitable for embodying the principles of this aspect of the present invention is shown in FIG. 12. The embodiment of FIG. 12 adjusts the coefficients $G_i$ of the equalizer 76 based on a function of factors including a difference between the equalized symbol $R(k)$ and the identified signal point $S_n(k)$, the corresponding demodulator output $D(k-i+1)$ of the equalizer, and an adaptive gain factor. The equalizing coefficients are adjusted after being used in generating the equalized symbol $R(k)$ and used by the equalizer 76 in generating at least one subsequent equalized symbol $R(k+1)$.

Referring to FIG. 12, the identified signal point $S_n(k)$ is subtracted from the equalized extracted symbol $R(k)$ in a summer 122 to yield a difference or error signal $E_n(k)$. The error signal $E_n(k)$ is adjusted by an adaptive gain factor 124 in a multiplier unit 126. In addition, the result of the foregoing described adjustment is used to multiply a signal $D^*(k-i+1)$ of the equalizing mean to generate corresponding coefficient error signals $e_i(k)$ utilizing the same multiplier unit 126. In turn, each coefficient error signal $e_i(k)$ is combined with its corresponding equalizing coefficient $G_i(k)$ in a summer 128 to generate corresponding adjusted equalizing coefficients $G_i(k+1)$ for use by the equalizer 76. A delay function 130 may separate the adjusted equalizing coefficients from the current equalizing coefficients during the combination process. The adaptive gain 124 used in the embodiment of FIG. 12 may be produced by either of the adaptive gain factor adjustment embodiments described in connection with either FIG. 10 or FIG. 11.

More specifically, when using the adaptive coefficient adjustment embodiment of FIG. 10, the individual coefficient error signals $e_i(k)$ are selectively input either in complex form or their in-phase and quadrature component form to the respective low pass filter and absolute value sections utilizing the demultiplexer 100. Accordingly, the outputs of the absolute value sections are combined in the summer 102 and modified by the fixed coefficient G in the multiplier 106 to produce the adaptive gain factor 124 of FIG. 12 for use in the equalizer 76 of FIG. 6 for subsequently equalizing symbol $R(k+1)$ of the train. Similarly, when using the embodiment of FIG. 11 to generate individual adaptive gains in adjusting the equalizer coefficients $G_i$, each error signal $e_i(k)$ is input to a corresponding low pass filter 112 which is cascaded with an absolute value section 114. The resultant signal is modified by the gain $G_F$ in the multiplexer 116 to yield the corresponding individual adaptive gain which is used for subsequently equalizing symbol $R(k+1)$. In this manner, the coefficients of the equalizer 76 may be adjusted with an adaptive coefficient based on a function of the generated error signals $e_i(k)$.

Figure 13:
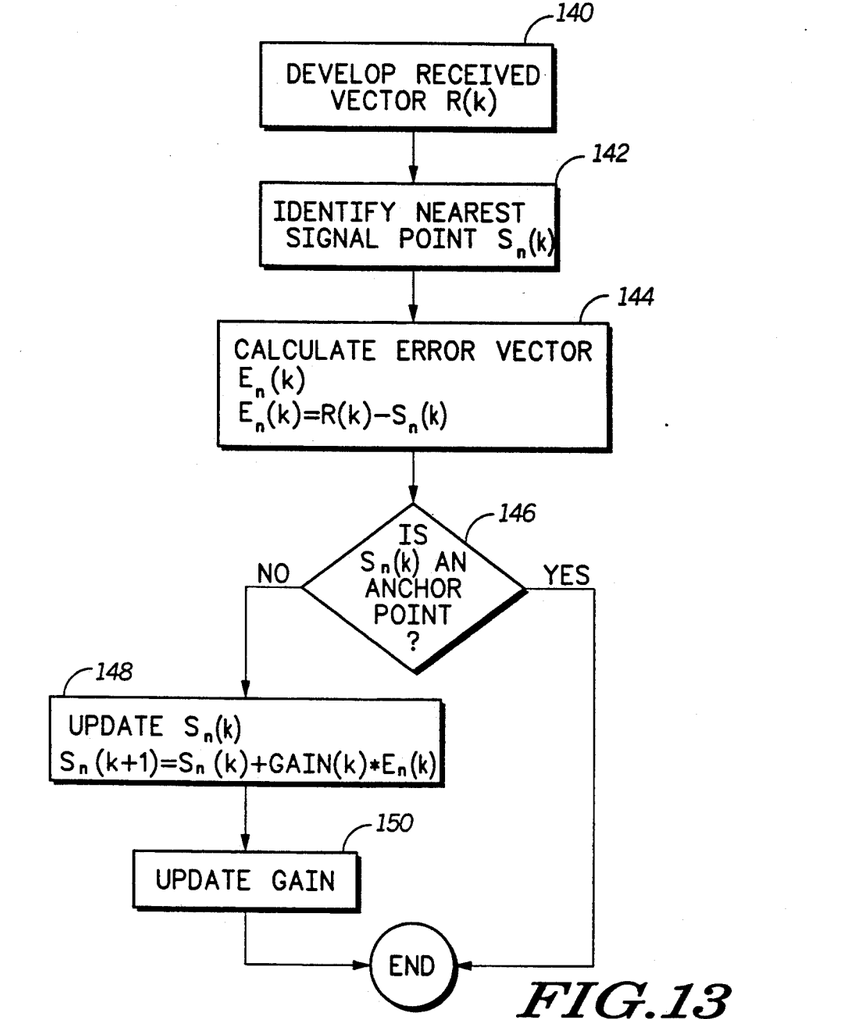
FIGS. 13 and 14 exemplify a program flowchart for use in programming a digital signal processor embodiment of the processes described in connection with the embodiment of FIG. 6.

The apparatus described in connection with the embodiment of FIG. 6 may be implemented in a digital signal processor which may be of the type manufactured by NEC Corporation bearing Model No. 77P25 or 77C25, for example. In this regard, FIGS. 13 and 14 exemplify a program flowchart for use in implementing the foregoing described functions in the digital signal processor. A signal point adjuster algorithm begins at block 140 in FIG. 13 in which the vector $R(k)$, equalized or otherwise, is developed from the received communication signal either in complex form or in the form of its individual in-phase and quadrature components $R_I(k)$ and $R_Q(k)$, respectively. Next, in block 142 the nearest signal point $S_n(k)$ to the vector $R(k)$ becomes the identified signal point of the receive constellation corresponding to $R(k)$. In block 144, the error vector $E_n(k)$ is computed as the difference between the nearest signal point $S_n(k)$ and the vector $R(k)$. In some circumstances, some of the signal points of the receive constellation are predetermined as being nonadjustable especially when an equalizer function is provided in the receiving modem. These nonadjustable signal points, which may be those signal points of the receive constellation closest to the origin thereof, are referred to in the instant embodiment as "anchor" points. The intent is to inhibit the signal point adjuster from adjusting those identified signal points which are predetermined to be "anchor" points, which is accomplished in the next decisional block 146. If the decision block 146 identifies the signal point $S_n(k)$ as being an "anchor" point, the program execution bypasses the signal point adjustment process. Otherwise, the next block to be executed is 148 wherein the signal point is adjusted based on an adaptive coefficient and the difference between the identified signal point and the equalized $R(k)$. In block 150, the gain is adaptively adjusted in accordance with the routine shown in FIG. 14.

Figure 14:
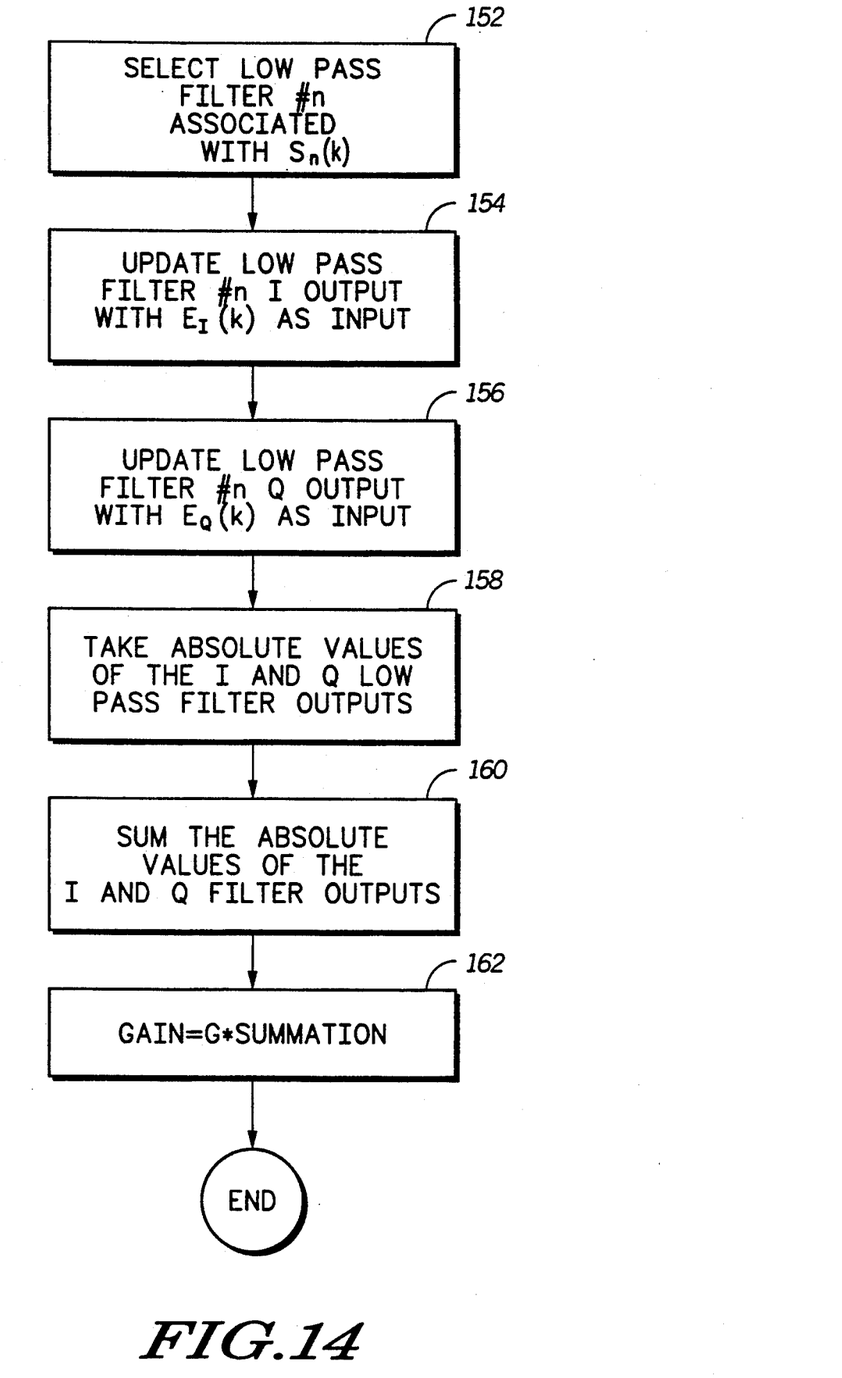

Referring to FIG. 14, to start with, in block 152, a low pass filter associated with the identified signal point $S_n(k)$ is selected. When using the in phase and quadrature component of the error signal, the outputs of the selected in phase and quadrature low pass filters are updated based on using the respective in phase and quadrature error signals as inputs in the blocks 154 and 156. Next, in block 158 the absolute values of the in phase and quadrature low pass filter outputs are taken and combined by summation in the block 160. The adaptive coefficient is computed in block 162 by modifying the summation of block 160 by a fixed gain represented by G which may be on the order of 0.2, for example. The adaptive gain then is used in block 148 of the signal point adjustment subroutine of FIG. 13 for processing the next equalized symbol $R(k+1)$.

It is worth noting that while the various aspects of the present invention have been identified in accordance with the foregoing described embodiment, it is understood that additions, deletions, and modifications may be made thereto without deviating from the broad principles thereof. Accordingly, the various aspects of the present invention should not be limited to any single embodiment, but rather construed in broad scope and breadth in accordance with the recitation of the appended claims.

What is claimed is:

1. Apparatus for receiving a communication signal communicated over a communication medium, the communication signal modulated to include digital data in the form of a train of symbols based on a predetermined transmit constellation of signal points, each signal point of the transmit constellation representing a digital code, each symbol of the train having a symbol period and positioned by modulation substantially at the signal point of the transmit constellation corresponding to the digital data code intended to be represented thereby in the train, the modulated symbols of the communication signal being distortable in the communication thereof, the apparatus arranged for processing the received modulated symbols in accordance with a receive constellation of signal points to retrieve the digital data thereof, the apparatus comprising:

means for demodulating at each symbol period a modulated symbol from the received communication signal to generate a demodulator output, $D(k)$;

means for identifying a signal point $S_n(k)$ of the receive constellation corresponding to $D(k)$ based on a predetermined criteria, the signal point $S_n(k)$ being used to retrieve the digital data code of $D(k)$; and means for adjusting the signal point from its current position $S_n(k)$ to a new position $S_n(k+1)$ of the receive constellation based on the position of $D(k)$ in relation to the current position $S_n(k)$ for use by the identifying means in identifying the signal point of the receive constellation corresponding to at least one subsequent demodulator output $D(k+1)$ of the train.

2. The apparatus in accordance with claim 1 wherein the identifying means includes means for identifying the nearest signal point to $D(k)$ i the receive constellation as the signal point $S_n(k)$.

3. The apparatus in accordance with claim 1 wherein the adjusting means includes:

means for determining an error signal $E_n(k)$ from the positions of $D(k)$ and the signal point $S_n(k)$ in the receive constellation;

means for adjusting the error signal $E_n(k)$ with a gain factor to generate an adjusted error signal; and means for combining the current position $S_n(k)$ of the signal point with the adjusted error signal to generate the new position $S_n(k+1)$ of the signal point.

4. The apparatus in accordance with claim 3 including means for adjusting the gain factor corresponding to the kth symbol period to a new gain factor for the subsequent (k+1)th symbol period based on the error signal $E_n(k)$ corresponding to $D(k)$.

5. The apparatus in accordance with claim 4 wherein the gain factor adjusting means includes means for filtering the error signal $E_n(k)$ to generate a filtered error signal and means for taking the absolute value of the filtered error signal to generate a signal representative of the new gain factor.

6. The apparatus in accordance with claim 4 wherein the gain factor adjusting means includes:

a set of low pass filters comprising a set of low pass filter means for filtering each error signal $E_n(k)$ of a selected set of signal points of the receive constellation and further comprising a corresponding set of means for forming absolute values respectively coupled to the set of low pass filter means;

means for selecting a low pass filter means and corresponding absolute value means based on the identified signal point of the receive constellation corresponding to the demodulator output thus forming a selected low pass filter means and corresponding absolute value means, the selected low pass filter means and corresponding absolute value means thus processing the error signal $E_n(k)$ to generate an intermediate signal; and means for combining the intermediate signals generated from the set of low pass filter means and corresponding absolute value means to generate a signal representative of the new gain factor.

7. The apparatus in accordance with claim 6 including means for modifying the signal representative of the new gain factor to yield the new gain factor.

8. The apparatus in accordance with claim 1 including means for predetermining a set of nonadjustable signal points of the receive constellation and means for inhibiting the adjusting means from adjusting the identified signal point when the identified signal point is predetermined to be a member of the set of nonadjustable signal points.

9. The apparatus in accordance with claim 1 wherein the communication medium includes at least one telephone line, and the apparatus includes a modem.

10. The apparatus in accordance with claim 1 wherein the communication medium includes a cellular telephone network, and the apparatus includes a cellular telephone and a modem coupled thereto.

11. Apparatus for receiving a communication signal communicated over a communication medium, the communication signal modulated to include digital data in the form of a train of symbols based on a predetermined transmit constellation of signal points, each signal point of the transmit constellation representing a digital code, each symbol of the train having a symbol period and positioned by modulation substantially at the signal point of the transmit constellation corresponding to the digital data code intended to be represented thereby in the train, the modulated symbols of the communication signal being distortable in the communication thereof, the apparatus arranged for processing the received modulated symbols in accordance with a receive constellation of signal points to retrieve the digital data thereof, the apparatus comprising:

means for demodulating at each symbol period a modulated symbol from the received communication signal to generate a demodulator output, $D(k)$;

means for equalizing the demodulator output by processing the demodulator output and at least one other demodulator output $D(k \pm m)$ with corresponding equalizing coefficients to yield an equalized symbol $R(k)$;

means for identifying a signal point $S_n(k)$ of the receive constellation corresponding to the equalized symbol $R(k)$ based on a predetermined criteria, the signal point $S_n(k)$ being used to retrieve the digital data code of the equalized symbol $R(k)$; and means for adjusting the equalizing coefficients based on the difference between the equalized symbol $R(k)$ and the identified signal point $S_n(k)$, the at least one other demodulator output $D(k \pm m)$, and an adaptive gain factor, the adjusted equalizing coefficients being used by the equalizing means to process at least one subsequent demodulator output $D(k+1)$ of the train.

12. The apparatus in accordance with claim 11 wherein the identifying means includes means for identifying the nearest signal point to the equalized symbol $R(k)$ in the receive constellation as the signal point $S_n(k)$.

13. The apparatus in accordance with claim 11 wherein the adjusting means includes:

means for determining an error signal $E_n(k)$ from the positions of the equalized symbol $R(k)$ and the signal point $S_n(k)$ in the receive constellation;

means for generating a coefficient error signal for each equalizing coefficient based on the error signal $E_n(k)$, the adaptive gain factor, and the corresponding demodulator output; and means for combining each coefficient error signal with its corresponding equalizing coefficient to generate corresponding adjusted equalizing coefficients for use by the equalizing means.

14. The apparatus in accordance with claim 13 including means for generating the adaptive gain factor for the subsequent (k+1)th symbol period based on the coefficient error signals corresponding to the kth symbol period.

15. The apparatus in accordance with claim 14 wherein the adaptive gain factor generating means includes means for filtering the coefficient error signals to generate filtered coefficient error signals and means for taking the absolute value of the filtered coefficient error signals to generate a signal representation of the adaptive gain factor.

16. The apparatus in accordance with claim 14 wherein the adaptive gain factor generating means includes:

a set of low pass filters including a set of low pass filter means for filtering each coefficient error signal of the equalizing means and further including a corresponding set of means for forming absolute values respectively coupled to the set of low pass filter means;

means for processing each coefficient error signal by its corresponding low pass filter means and corresponding absolute value means to generate a set of intermediate error signals; and means for combining the set of intermediate error signals to generate a signal representative of the adaptive gain factor.

17. The apparatus in accordance with claim 16 including means for modifying the generated signal of the combining means to yield the adaptive gain factor.

18. The apparatus in accordance with claim 13 wherein the coefficient error signal generating means includes means for multiplying the error signal $E_n(k)$ with the adaptive gain factor to yield a resultant signal, and for multiplying the resultant signal with a signal representative of each demodulator output of the equalizing means to generate corresponding coefficient error signals.

19. The apparatus in accordance with claim 11 wherein the communication medium includes at least one telephone line, and the apparatus includes a modem.

20. The apparatus in accordance with claim 11 wherein the communication medium includes a cellular telephone network, and the apparatus includes a cellular telephone and a modem coupled thereto.

21. Apparatus for receiving a communication signal communicated over a communication medium, the communication signal modulated to include digital data in the form of a train of symbols based on a predetermined transmit constellation of signal points, each signal point of the transmit constellation representing a digital code, each symbol of the train having a symbol period and positioned by modulation substantially at the signal point of the transmit constellation corresponding to the digital data code intended to be represented thereby in the train, the modulated symbols of the communication signal being distortable in the communication thereof, the apparatus arranged for processing the received modulated symbols in accordance with a receive constellation of signal points to retrieve the digital data thereof, the apparatus comprising:

means for demodulating at each symbol period a modulated symbol from the received communication signal to generate a demodulator output, $D(k)$;

means for equalizing the demodulator output by processing the demodulator output and at least one other demodulator output $D(k\pm m)$ with corresponding equalizing coefficients to yield an equalized symbol $R(k)$;

means for identifying a signal point $S_n(k)$ of the receive constellation corresponding to the equalized symbol $R(k)$ based on a predetermined criteria, the signal point $S_n(k)$ being used to retrieve the digital data code of the equalized symbol $R(k)$;

first adjusting means for adjusting the equalizing coefficients based on a difference between the equalized symbol $R(k)$ and the identified signal point $S_n(k)$, the at least one other demodulator output $D(k\pm m)$, and an adaptive gain factor, the adjusted equalizing coefficients being used by the equalizing means to process at least one subsequent demodulator output $D(k+1)$ of the train; and second adjusting means for adjusting the identified signal point from its current position $S_n(k)$ to a new position $S_n(k+1)$ in the receive constellation based on the position of the equalized symbol $R(k)$ in relation to the current position $S_n(k)$ for use by the identifying means in identifying the signal point of the receive constellation corresponding to at least one subsequently equalized symbol $R(k+1)$ of the train.

22. The apparatus in accordance with claim 21 wherein the identifying means includes means for identifying the nearest signal point to the equalized symbol $R(k)$ in the receive constellation as the signal point $S_n(k)$.

23. The apparatus in accordance with claim 21 wherein the first adjusting means includes:

means for determining an error signal $E_n(k)$ from the positions of the equalized symbol $R(k)$ and the signal point $S_n(k)$ in the receive constellation;

means for generating a coefficient error signal for each equalizing coefficient based on the error signal $E_n(k)$, the adaptive gain factor, and the corresponding demodulator output; and means for combining each coefficient error signal with its corresponding equalizing coefficient to generate corresponding adjusted equalizing coefficients for use by the equalizing means.

24. The apparatus in accordance with claim 23 including means for generating the adaptive gain factor for the subsequent (k+1)th symbol period based on the coefficient error signals corresponding to the kth symbol period.

25. The apparatus in accordance with claim 24 wherein the adaptive gain factor generating means includes means for filtering the coefficient error signals to generate filtered coefficient error signals and means for taking the absolute value of the filtered coefficient error signals to generate a signal representation of the adaptive gain factor.

26. The apparatus in accordance with claim 24 wherein the adaptive gain factor generating means includes:

a set of low pass filters including a set of low pass filtering means for filtering each coefficient error signal of the equalizing means and further including a corresponding set of means for forming absolute values respectively coupled to the set of low pass filter means;

means for processing each coefficient error signal by its corresponding low pass filter means and corresponding absolute value means to generate a set of intermediate error signals; and means for combining the set of intermediate error signals generated from the set of low pass filter means and corresponding absolute value means to generate a signal representative of the adaptive gain factor.

27. The apparatus in accordance with claim 26 including means for modifying the generated signal of the combining means to yield the adaptive gain factor.

28. The apparatus in accordance with claim 23 wherein the coefficient error signal generating means includes means for multiplying the error signal $E_n(k)$ with the adaptive gain factor to yield a resultant signal and for multiplying the resultant signals with each demodulator output of the equalizing means to generate corresponding coefficient error signals.

29. The apparatus in accordance with claim 23 wherein the second adjusting means includes means for adjusting the error signal $E_n(k)$ with a gain factor to generate an adjusted error signal and means for combining the current position $S_n(k)$ of the signal point with the adjusted error signal to generate the new position $S_n(k+1)$ of the signal point.

30. The apparatus in accordance with claim 29 including means for adjusting the gain factor of the kth symbol period to a new gain factor for the subsequent (k+1)th symbol period based on the error signal $E_n(k)$ corresponding to the kth symbol period.

31. The apparatus in accordance with claim 30 wherein the gain factor adjusting means includes means for filtering the error signal $E_n(k)$ to generate a filtered error signal and means for taking the absolute value of the filtered error signal to generate a signal representation of the new gain factor.

32. The apparatus in accordance with claim 30 wherein the gain factor adjusting means includes:

a set of low pass filters comprising a set of low pass filter means for filtering each error signal $E_n(k)$ of a selected set of signal points of the receive constellation and further comprising a corresponding set of means for forming absolute values respectively coupled to the set of low pass filter means;

means for selecting a low pass filter means and corresponding absolute value means based on the identified signal point of the receive constellation, corresponding to the kth symbol period, the selected low pass filter means and corresponding absolute value means processing the error signal $E_n(k)$ to generate an intermediate signal; and means for combining the intermediate signals generated from the set of low pass filter means and corresponding absolute value means to generate a signal representative of the new gain factor.

33. The apparatus in accordance with claim 32 including means for modifying the generated signal of the combining means to yield the gain factor.

34. The apparatus in accordance with claim 21 including means for predetermining a set of nonadjustable signal points of the receive constellation and means for inhibiting the second adjusting means from adjusting the identified signal point when the identified signal point is predetermined to be a member of the set of nonadjustable signal points.

35. The apparatus in accordance with claim 21 wherein the communication medium includes at least one telephone line, and the apparatus includes a modem.

36. The apparatus in accordance with claim 21 wherein the communication medium includes a cellular telephone network, and the apparatus includes a cellular telephone and a modem coupled thereto.

* * * * *